Feb. 1, 1955

C. J. SCHROEDER 2,701,047

TRACTION TREAD RAMP AND CONVEYER

Filed July 21, 1951

INVENTOR.
Carl J. Schroeder
BY
Everett A. Johnson
ATTORNEY

Feb. 1, 1955     C. J. SCHROEDER     2,701,047
TRACTION TREAD RAMP AND CONVEYER
Filed July 21, 1951     3 Sheets-Sheet 2
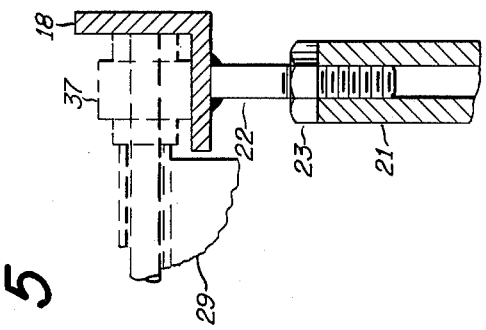
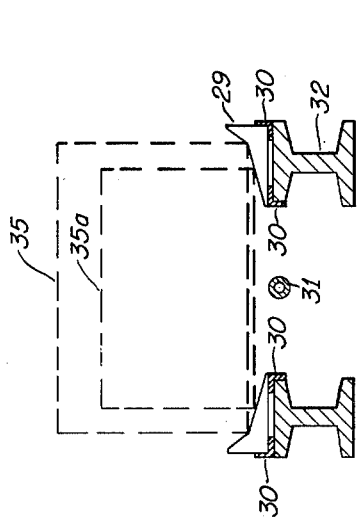
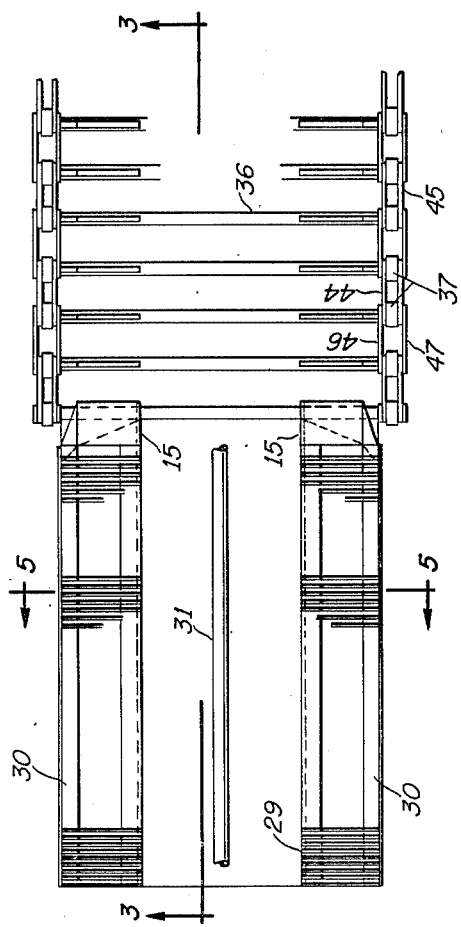
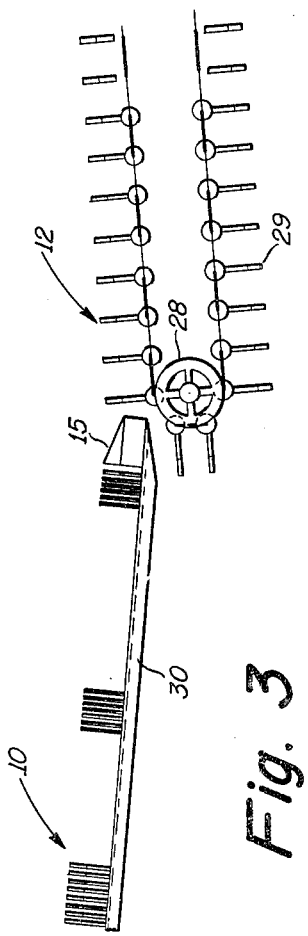
INVENTOR.
Carl J. Schroeder
BY
Everett A. Johnson
ATTORNEY

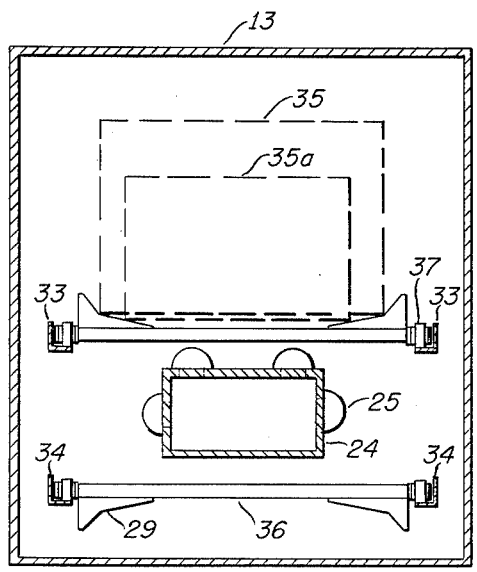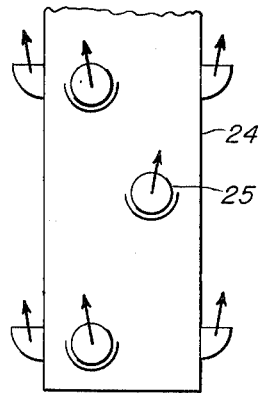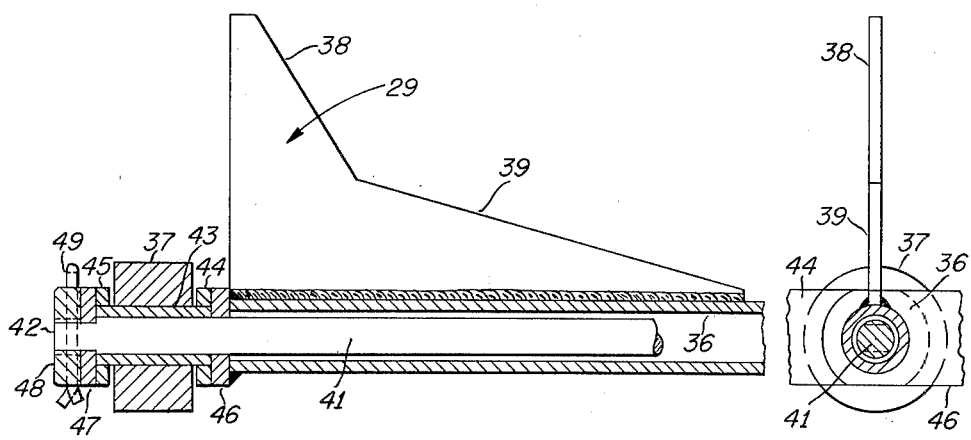

United States Patent Office 2,701,047
Patented Feb. 1, 1955

2,701,047

TRACTION TREAD RAMP AND CONVEYER

Carl J. Schroeder, Hammond, Ind., assignor to Standard Oil Company, Chicago, Ill., a corporation of Indiana Application July 21, 1951, Serial No. 237,917

8 Claims. (Cl. 198—43)

This invention relates to an improved barrel conveyor and barrel ramp, particularly adapted to the handling of freshly painted barrels.

Heretofore the handling of freshly painted steel barrels on conventional conveyors has not been entirely satisfactory because of contact marks left on the barrels and because of improper centering of the barrels and the subsequent shifting and crowding on the conveyor. Likewise, in transferring barrels from and to conveyors by rolling over parallel rails or flat runs, the freshly painted surfaces are marred. Furthermore, traction on ramps of conventional design is poor with freshly painted surfaces and the barrels tend to skid or skew and stop rolling.

It is therefore an object of my invention to provide a conveyor and ramp assembly which insures instant and positive centering of the barrel and which accommodates different sizes of barrels. A further object is to provide an apparatus which minimizes difficulties arising from paint accumulation and minimizes marring of barrels during transport. An additional object of the invention is to provide a ramp and conveyor which prevents the tendency of a freshly painted barrel to skid and skew. It is also an object of the invention to provide an easily demountable ramp which permits easy cleaning and removal of excess paint accumulation from the ramp.

Still another object is to provide barrel-supporting means on the conveyor whose spacing is wide enough to prevent barrels rolling freely thereon, yet also close enough to prevent barrels crowding on each other. An additional object is to provide means which avoids the necessity for intricate timing mechanisms to deposit barrels on the conveyor in spaced array.

A further object of the invention is to provide a conveyor adapted to support barrels on their chines regardless of condition of the barrel. Still another object is to provide a combination of means which allows close minimum spacing of the barrels without crowding each other in transit. These and other objects of the invention will become apparent to those skilled in the art as the description thereof proceeds.

Briefly I attain the objects of my invention by providing plate saddles for a traction tread ramp and as chine supports on a conveyor. Each saddle has a steeply sloped side guide edge and an inclined contacting edge to support the barrel. They are arranged in pairs to subtend the ends of the barrels. These plate saddles are designed to readily receive all common sizes and shapes of barrels in general use, to automatically center the barrels within certain limits, to support the barrels at the chines in order to eliminate marred painted surfaces and to reduce to a minimum the accumulation and pick-up of wet paint.

The plate saddles have an upstanding angular shoulder which prevents shifting and projection of the ends of the barrels over the side of the conveyor or ramp. The lower edge slopes inwardly and downwardly to clear the sides of bilged barrels and the sides and rolling hoops on drum-type barrels. Barrels roll with chine contact on the sloping supporting edges which act as non-skid traction grips to prevent the barrel from skidding. The narrow edged contacts pick up and hold a minimum of fresh paint and minimize marring the barrel chine. In any event the chine contact keeps the conveyor or ramp marks where they are least noticeable. The plates present no retarding drag by scraping or friction action on the barrel ends and they clear any projecting bungs. Damaged and dented barrels likewise roll smoothly over the ramp and onto the conveyor whereas solid runs or rails permit barrels to skid and skew. The saddle plates on the conveyor are spaced farther apart than on the ramp because here there is no need for barrels to roll freely and the larger saddle plate spacing reduces the tendency for barrels to roll.

Additional details of my invention will be described in connection with the accompanying drawings which form a part of this specification and wherein:

Figures 1 and 1a comprise an elevation of an assembly including the loading ramp, conveyor, drying oven, and discharge ramp;

Figure 2 is a detail of the hold-down rails in Figure 1a;

Figures 3 and 4 are a top view and an elevation, respectively, of the loading ramp portion of the assembly in Figure 1;

Figure 5 is an elevation of a section of the ramp along the lines 5—5 in Figure 4;

Figure 6 is an elevation taken along the line 6—6 of Figure 1;

Figure 7 is a top view of the heating duct in Figures 1 and 6; and

Figures 8 and 9 are sectional views showing the saddle plate on the conveyor chain.

Figure 1:
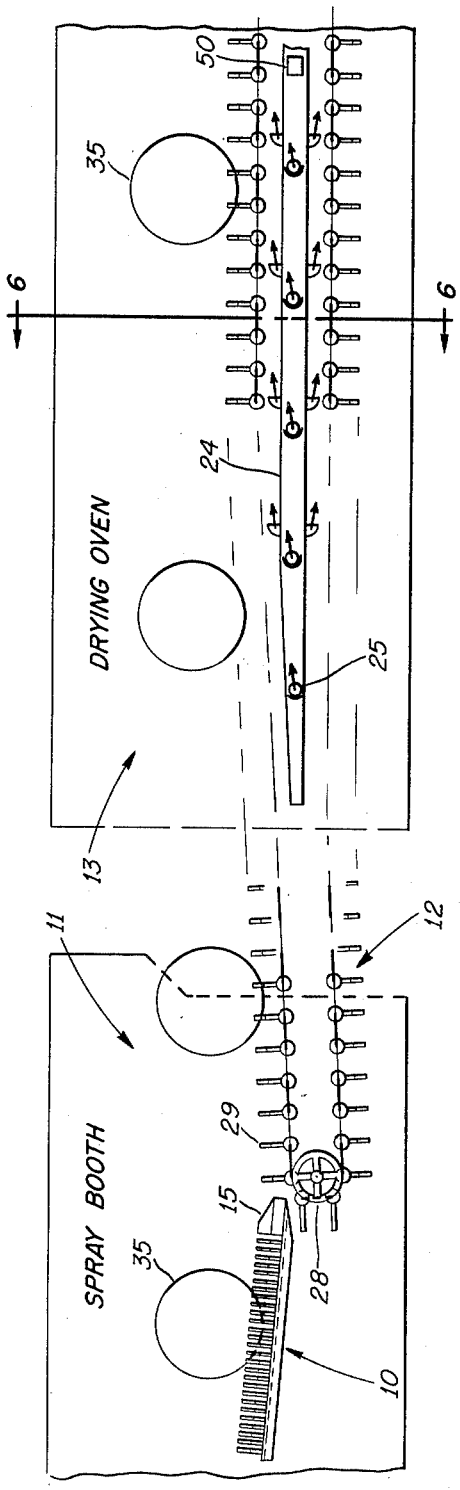
Figure 1A:
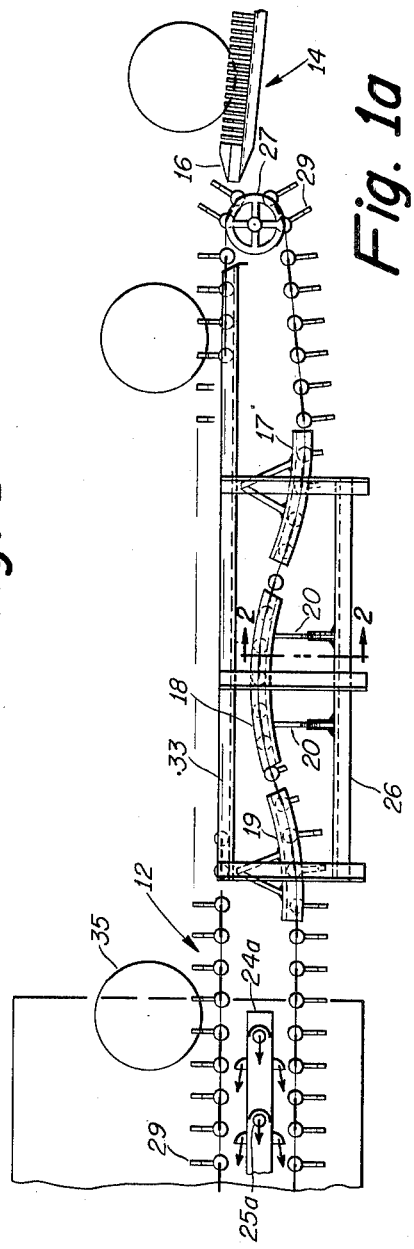

Referring to the drawings, Figures 1 and 1a illustrate my general assembly, including the loading ramp 10, the conveyor 12 which passes through the spray booth 11 and drying oven 13, and discharge ramp 14. Transition plates 15 and 16 bridge the gap between the ends of the conveyor 12 and the two ramps 10 and 14.

The conveyor chain assembly 12 passes over drive sprocket 27 and idler sprocket 28 and to maintain the desired tension in the conveyor chain, I may provide fixed hold-down rails 17 and 19 which, together with the adjustable supporting rail 18 provide for chain take-up or adjustment. The adjustable supporting rail 18 is supported by adjustable braces 20 and one embodiment thereof is shown in Figure 2 which is a section along the line 2—2 in Figure 1a. The brace comprises a tube 21, a threaded rod 22 and an adjusting nut 23, the lower end of the threaded rod 22 being fixed as by welding to the angle iron 18. By turning the adjusting nut 23 the effective length of the brace 20 is changed so as to move the supporting rail 18, thereby decreasing or increasing the tension on the conveyor chain assembly 12.

The return or lower flight of the conveyor 12 travels below the fixed hold-down rail 17, over the adjustable supporting rail 18 and under the stationary hold-down rail 19. Finally the conveyor chain assembly 12 is drawn over the idler sprocket 28 and below the ramp 10 for repeating the cycle.

In operation, the barrels 35 are placed upon the ramp 10 by any suitable manual or automatic means so that the chines of the barrels are supported by the saddle plates 29. The barrels roll along the ramp 10 and over the transition plate 15 and onto the conveyor 12.

While on the conveyor 12, the barrel is supported on adjacent pairs of saddle plates 29 in a relatively fixed position with respect to the conveyor and moves into the drying oven 13. Within the oven 13 I provide a hot air duct 24 which has a multiplicity of deflector shields 25 and 25a which discharge the heating gases into the housing of the oven 13. An inlet duct 50 supplies the hot gases to the duct 24. The barrel 35 is then carried on the conveyor 12 from the oven 13 onto the ramp 14 which may be of a construction similar to ramp 10.

Figures 3, 4 and 5 illustrate details of the ramp construction. The ramp 10 comprises a pair of similar sections including the ramp frame 30 which may be angle irons and the multiplicity of saddle plates 29. The saddle plates 29 are fixed on about 1.5 inch centers on opposite sides of the ramp and may be tack welded to the ramp subframe 30. Each subsection can be separately removed to facilitate cleaning of the ramp. A center guide and brace member 31 may be provided to extend longitudinally of the ramp 10 midway between the ramp sections and decrease the free fall space between the ramp sections. The entire ramp 10 can be supported in any desired manner, for example on a concrete base or on a structural frame 32.

Referring to Figure 6, the upper flight of the conveyor 12 travels between guide rails 33 which may comprise L-shaped angle irons providing a lateral guide and a track for the rollers 37 on the conveyor chain. The lower flight of the conveyor travels on a similar pair of conveyor guide rails 34. The hot air duct 24 is arranged between the two flights of the conveyor and hot air is introduced into the oven 13 in opposed directions as described above. Figure 7 illustrates the terminal of the duct 24 with the shields 25 directing the hot air into the oven 13 to minimize the loss of heating air.

The details of the conveyor elements, including the tube 36, the saddle plate 29 and the rollers 37, are shown in Figures 8 and 9 taken with Figure 4. The individual saddle plates 29 are mounted in pairs on opposite ends of the tube 36 which in turn are moved along the guide rails on rollers 37. Each saddle plate has an upstanding guide edge 38 which is sloped about 30° from the vertical and a contacting edge 39 sloped downwardly at an angle, preferably about 15° to the axis of the tube 36. By this construction the chine of the barrel normally rests on the edge 39 and the angular edge 38 acts with a corresponding edge on a plate 39 on the other conveyor section to center and guide the barrel on the conveyor.

The transition or bridging plates 15 and 16 of the ramps 10 and 14, arranged in pairs at the ends of the conveyor 12, each comprises a flat rectangular section and an integral upstanding triangular section. The plane of the slope of the triangular section corresponds to the slope of the guiding edge 38 of the saddle plate 29 whereas the rectangular section lies in a plane parallel to the sloping contact edge 39 of the saddle plate 29. Thus the use of these bridging plates permits a smooth transfer of the barrel from or to the ramps 10 and 14 and the conveyor 12.

The rollers 37 are mounted about bushing 43 press fitted between inner chain links 44 and 45. Thus, the bushing 43 comprises a friction bearing for the roller 37. The outer link 47 is keyed to the end of the axle shaft 41 which extends within the shaft tube 36. The ends of tube 36 abut the outer links 46 and are welded thereto with the result that the saddle plates 29 are maintained in rigid upright array in travel of the upper conveyor flight.

From the described construction it will be seen that the rollers 37 travel within the guide rails 33 and 34 and about the sprockets 27 and 28 with the saddle plates 29 extending upright on the conveyor 12. Accordingly, the saddle plates 29 are rigid with respect to the tube shaft 36 and to the outer links 46 and 47. Such an arrangement of conveyor supports, holds the transported barrels with a minimum of marring, and discharges them with a minimum of scraping of the painted surfaces.

In general, I have attained the objects of my invention and have provided a traction tread for a ramp and for an endless conveyor. Ramps employing the tread do not permit the barrels to turn or skew. Likewise, the arrangement of the treads on the endless conveyor as described permits the transport of freshly painted barrels expeditiously with a minimum of damage.

Although I have described my invention by reference to particular embodiments thereof, it should be understood that this is by way of illustration only. Accordingly, it is contemplated that modifications can be made by those skilled in the art in view of my disclosure without departing from the described invention.

I claim:

1. A barrel support tread comprising a relatively thin flat upstanding plate having a straight bottom edge, a side edge, a downwardly sloping top edge having a steeply sloped section and a merging section of lesser slope, said plate being adapted to be mounted on its bottom straight edge normal to its support to provide a downwardly sloping contact edge and an upwardly sloping guide edge for a barrel chine without contacting a wall of a barrel when supported on said tread.

2. A barrel support tread comprising a flat plate of generally quadrilateral configuration adapted to be mounted on a bottom straight edge to provide a downwardly sloping upper chine-contacting edge and a more steeply sloping barrel-end guiding edge.

3. A barrel handling apparatus comprising a traction tread ramp including a pair of similar units each consisting of a frame member having parallel supporting means, and a multiplicity of upstanding saddle plates each arranged on edge between said beams transverse to the intended direction of travel of barrels over the apparatus, said plates having a downwardly sloped barrel contacting edge which slopes downwardly toward the center of the apparatus and a lateral guiding edge upstanding from said contact edge and sloping steeply outward therefrom.

4. A barrel conveyor comprising a pair of endless flat link conveyor chain means, parallel guide rails supporting parallel flights of said endless chain means, a plurality of shaft means extending transversely between parallel flights of said chain means and rigidly connected to alternate parallel pairs of flat links in said chain means, roller means adapted to movably support said chain means within said conveyor guide rails, and a pair of upstanding flat saddle plates on opposite ends of said shaft means, said saddle plates being fixed radially of said shaft means and extending perpendicular to the line of travel of said conveyor chain means.

5. In a barrel transporting system including gravity ramp means and driven endless conveyor means, the improvement which comprises a first array of closely spaced traction plates mounted on their lower edges, a second array of closely spaced traction plates mounted on their lower edges, said arrays of traction plates being fixed to frames forming spaced removable parallel units inclined generally downwardly toward a driven endless conveyor, and a multiplicity of similar upstanding traction plates carried in aligned and spaced pairs by said conveyor whereby a barrel is transported on only its chines supported on pairs of spaced upstanding plates both in rolling down said ramp and in moving on said conveyor.

6. A barrel support tread, comprising opposed pairs of upstanding plates of generally quadrilateral configuration and mounted in laterally spaced relation, said plates being arranged transverse to the intended direction of travel over said support tread and opposed pairs of plates being mounted on opposite ends of a shaft means and aligned parallel to the axis of said shaft means.

7. The apparatus of claim 6 wherein the shaft means is supported by a pair of endless conveyor chains.

8. A barrel supporting tread comprising a pair of endless flat-link conveyor chain means, a plurality of shaft support means mounted transversely between parallel flights of said chain means, and opposed pairs of saddle plates fixed to said shaft support means adjacent the ends thereof, each of said plates being of generally quadrilateral configuration and have a straight bottom edge, an upstanding side edge, an inwardly sloping top edge and a downwardly sloping edge merging with said inwardly sloping top edge.

References Cited in the file of this patent

UNITED STATES PATENTS

| Number | Name | Date |
|---|---|---|
| 223,410 | Taylor | Jan. 6, 1880 |
| 665,022 | Levalley | Jan. 1, 1901 |
| 847,509 | Riling et al. | Mar. 19, 1907 |
| 1,084,376 | Sykes | Jan. 13, 1914 |
| 1,179,602 | Bernheim | Apr. 18, 1916 |
| 1,298,489 | Frelinghuysen et al. | Mar. 25, 1919 |
| 1,737,819 | Wetmore | Dec. 3, 1929 |
| 1,883,528 | Buck | Oct. 18, 1932 |
| 1,979,466 | Hedenskoog | Nov. 6, 1934 |
| 2,155,173 | Sparling et al. | Apr. 18, 1939 |
| 2,169,772 | Schweitzer | Aug. 15, 1939 |
| 2,230,038 | Jeromos | Jan. 28, 1941 |
| 2,341,386 | Reichelt et al. | Feb. 8, 1944 |
| 2,387,918 | Lockwood | Oct. 30, 1945 |
| 2,427,958 | Gibson et al. | Sept. 23, 1947 |

FOREIGN PATENTS

| Number | Country | Date |
|---|---|---|
| 561,616 | Germany | Oct. 15, 1932 |